Oct. 5, 1943.     D. H. MITCHELL     2,331,217
CONVEYER SYSTEM
Filed Dec. 4, 1941     2 Sheets-Sheet 1
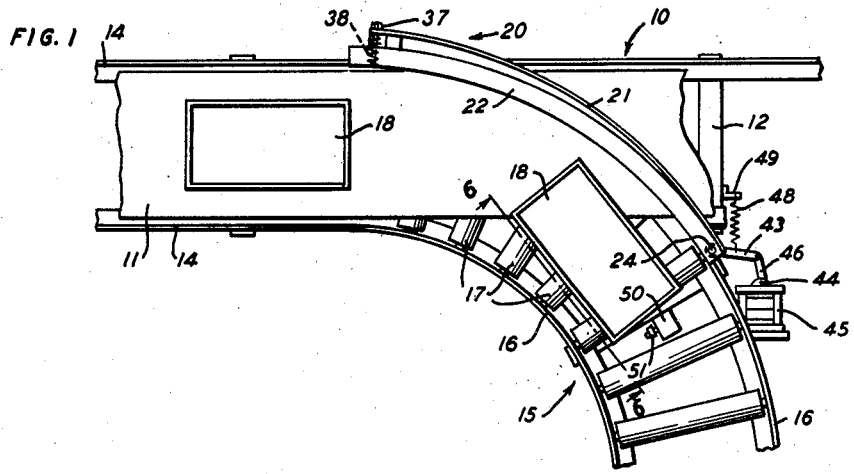
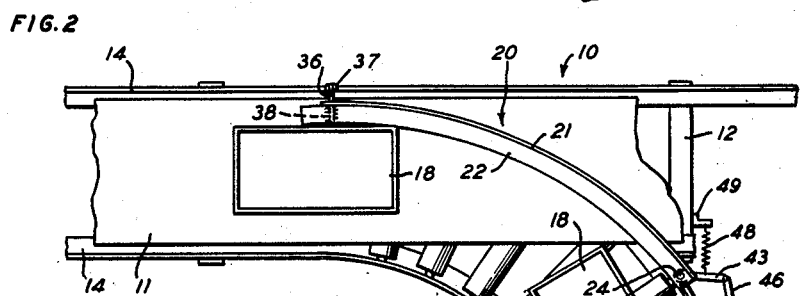
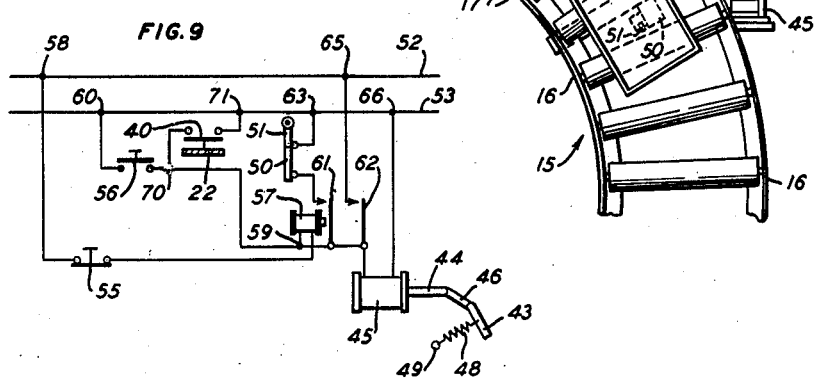
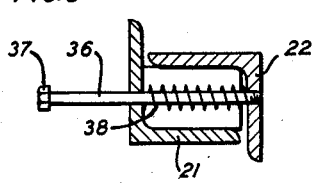
INVENTOR
D. H. MITCHELL
BY
E. R. Nowlan
ATTORNEY Oct. 5, 1943. D. H. MITCHELL 2,331,217
CONVEYER SYSTEM
Filed Dec. 4, 1941 2 Sheets-Sheet 2
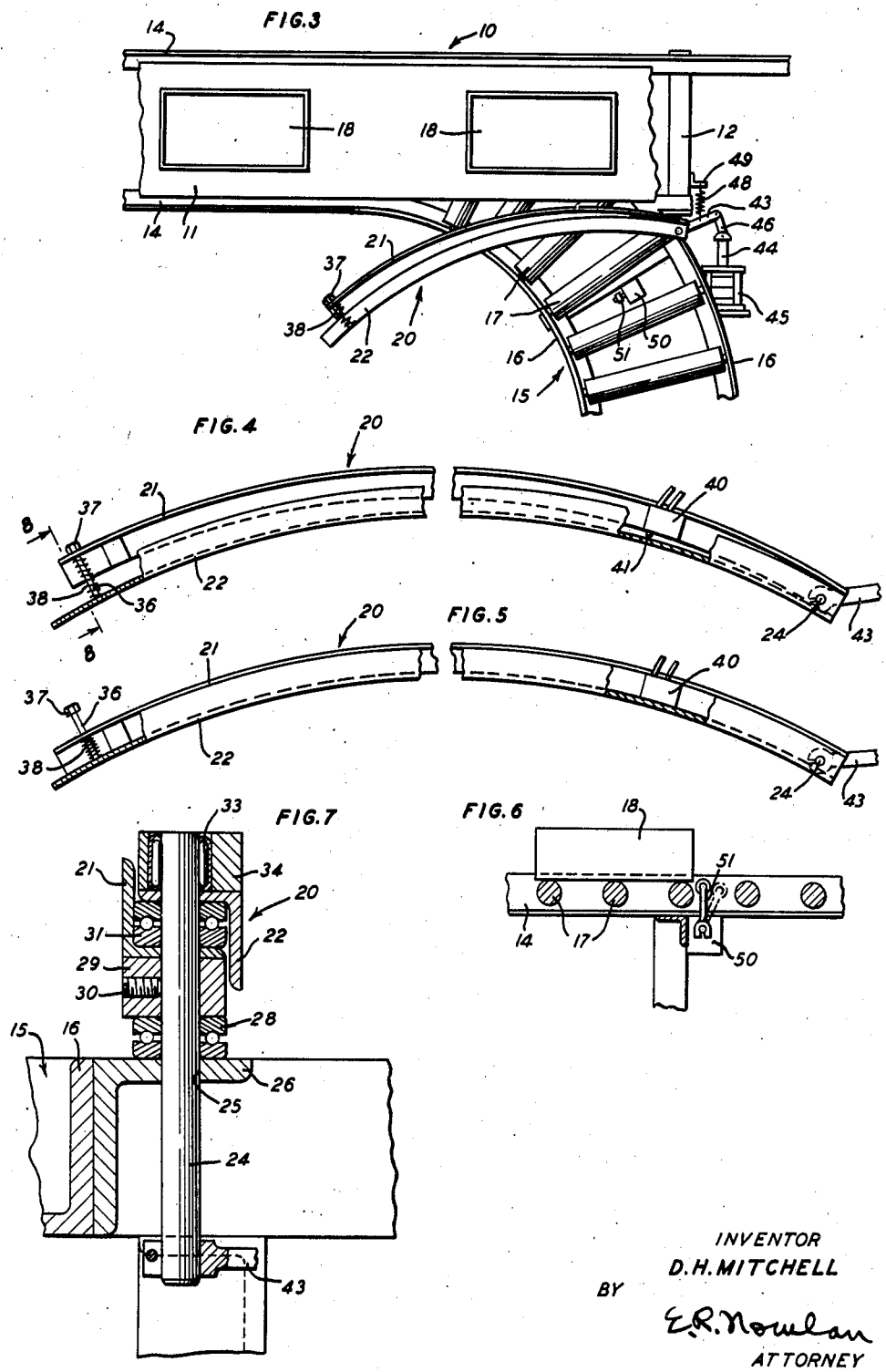
INVENTOR
D. H. MITCHELL
BY
E. R. Nowlan
ATTORNEY Patented Oct. 5, 1943

2,331,217

UNITED STATES PATENT OFFICE 2,331,217

CONVEYER SYSTEM

Donald H. Mitchell, Cranford, N. J., assignor to Western Electric Company, Incorporated, New York, N. Y., a corporation of New York Application December 4, 1941, Serial No. 421,577

7 Claims. (Cl. 198—21)

This invention relates to conveyer systems, and more particularly to deflector mechanisms therefor.

An object of the invention is to provide a conveyer system, particularly a deflector mechanism therefor, including a simple yet highly efficient control for a deflector arm in which a part of the control is incorporated.

With this and other objects in view, the invention comprises a deflector mechanism for a conveyer system having a main and branch conveyers, the deflector mechanism including a deflector arm having a control means for the actuation of the deflector arm at will to direct carriers from the main conveyer to the branch conveyer, a portion of the control means being incorporated in the arm to effect repeated deflection of carriers from the main conveyer to a branch conveyer.

Other objects and advantages will be apparent from the following detailed description when taken in conjunction with the accompanying drawings, wherein Fig. 1 is a fragmentary top plan view of a conveyer system illustrating the deflector mechanism with the deflector arm in actuated position;

Fig. 2 is a fragmentary top plan view of the structure shown in Fig. 1, illustrating a different stage in the operation of the deflector mechanism;

Fig. 3 is a fragmentary top plan view of the structure shown in Figs. 1 and 2, illustrating the deflector arm and its associated mechanism in their normal position;

Fig. 4 is an enlarged fragmentary top plan view of the deflector arm in an open position, portions thereof being shown in section;

Fig. 5 is a fragmentary top plan view of the deflector arm shown in closed position, portions thereof being broken away;

Fig. 6 is a fragmentary sectional view taken substantially along the line 6—6 of Fig. 1;

Fig. 7 is an enlarged fragmentary sectional view taken at the pivotal support of the deflector arm;

Fig. 8 is an enlarged sectional view taken along the line 8—8 of Fig. 4, and

Fig. 9 is a wiring diagram illustrating the control means for the deflector arm.

Referring now to the drawings, attention is directed first to Figs. 1, 2 and 3. In these figures a main conveyer 10 of the conventional type, having a continuous belt 11 travelling over suitable rollers 12 between side rails 14, has a branch conveyer 15 curving away therefrom and composed of side rails 16 with suitably spaced rollers 17 carried thereby. Carriers 18, of any suitable type, may be disposed upon the main conveyer to travel therealong past the branch conveyer 15 if so desired, a deflector arm, indicated generally at 20, being provided, however, to deflect any desired number of carriers onto the branch conveyer.

Attention is now directed to Figs. 4, 5 and 7, which illustrate the structure of the deflector arm 20 and the manner in which it is mounted. The deflector arm 20 consists mainly of two angle members 21 and 22 which are arcuate in general contour and disposed in overlapping positions as illustrated in Fig. 7. The members 21 and 22 of the arm 20 are supported at adjacent ends, namely their right ends (Figs. 4 and 5), upon a spindle 24. The spindle 24, as will be observed by viewing Fig. 7, extends vertically through an aperture 25 in a bracket 26, the latter being fixed to the adjacent side rail of the conveyer 15. A bearing 28, disposed concentric with the spindle, is supported by the bracket 26. A collar 29, disposed upon the bearing 28 concentric with the spindle 24, is adjustably secured to the latter by the aid of a set screw 30. The collar 29 is also secured to the arm member 21 at its upper surface by suitable means such as welding. Another bearing 31, disposed concentric with the spindle 24, is nested between the arm members 21 and 22, serving to support the latter for free movement relative to the former.

An additional supporting means for the member 22 is included in a bearing 33 disposed concentric with the spindle 24 in a collar 34, the latter being fixed to the arm member 22 by suitable means such as welding.

Attention is again directed to Figs. 4 and 5, which illustrate a control member 36 in the form of a bolt having one end, fixed to the member 22, extending through an aperture in the vertical wall of the member 21 and having a head portion to contact with the outer wall of the member 21 to limit the relative movement of the members of the deflector arm. A compression spring 38, disposed concentric with the control member 36 between the vertical walls of the arm members 21 and 22, normally urges the arm 22 into its normal position shown in Fig. 4. When in this position a switch 40, carried by the member 21, is in open position. The switch 40 includes a plunger 41 normally disposed outwardly, as shown in Fig. 4, the switch being of a normally open type, the plunger, however, being adapted to be closed by the arm member 22 when the latter is disposed in the closed position shown in Fig. 5.

The control mechanism associated with the spindle 24 includes a lever 43 having one end fixed to the lower end of the spindle, as shown in Fig. 7, the other end extending outwardly and being connected to a core 44 of a solenoid 45 through a suitable link 46. The solenoid is mounted in a suitable position so that upon energization thereof the spindle 24 will be rotated, through the link 46 and the lever 43, to move the arm 20 into the position shown in Fig. 1. Other means, such as a spring 48, interposed between the lever 43 and a bracket 49, where the ends of the spring are secured, may be provided to normally urge the deflector arm 20, through its connection with the spindle 24, into open position. If desired, in place of the spring 48 one end of a cable could be connected to the lever 43, the cable passing over a sheave, disposed at the bracket 49, and downwardly to a suitable weight to normally urge the deflector arm into its open position, which position is shown in Fig. 3.

The control mechanism for the deflector arm, in addition to the solenoid 45 and the switch 40, includes a release switch 50 mounted in the branch conveyer 15 with a roller arm 51 (Figs. 1, 2 and 6) normally disposed between a pair of the rollers 17 in a position to be engaged by carriers 18 passing thereon. The switch 50 is of the normally closed type, the arm 51 being retained normally in its vertical position but movable by carriers on the branch conveyer to the dotted line position, in which position the switch is open.

Attention is now directed to the wiring diagram in Fig. 9, where lead lines 52 and 53 represent a main supply circuit for supplying electrical energy to the control means. A normally closed manually operable switch 55 is disposed to cause deenergization of the solenoid 45 at will. A manually operable actuating switch 56 completes a circuit, when actuated, through a relay 57, which circuit may be traced from lead line 52, at 58, through the normally closed switch 55, the relay 57, through connection 59, switch 56, to line 53 at 60. Thus the closing of the switch 56 causes energization of the relay 57 to close the contacts 61 and 62. The closing of the contact 61 completes a locking circuit for the relay 57, which circuit may be traced from line 52, at 58, through switch 55, relay 57, connection 59, contact 61, normally closed release switch 50, to line 53 at connection 63. The manually operable switch 56 may thus be released after a short interval of time, the relay 57 remaining energized, however, through its locking circuit just described. The closing of the contact 62 completes a circuit from line 52, at 65, through contact 62, solenoid 45, to line 53 at connection 66. This completes the electrical control of the deflector arm.

The operation of the apparatus is as follows. With the deflector arm 20 in the position shown in Fig. 3, carriers 18 may travel along the main conveyer 10 undisturbed by the deflector arm. If the operator wishes the carriers to travel from the main conveyer onto the branch conveyer, he may acomplish this result by pressing the switch 56 closed, causing energization of the relay 57 to close the contacts 61 and 62, the former completing the locking circuit for the relay including the release switch 50, the latter, that is the contact 62, completing a circuit through the solenoid 45 to effect energization thereof. Energization of the solenoid 45 causes a pulling-up of the core 44 which, through its link 46 and lever 43, effects rotation of the spindle 24. This rotation of the spindle 24 although only a portion of a revolution, is sufficient to move the member 21 of the deflector arm 20 from the position shown in Fig. 3 to the position shown in Fig. 1.

The member 22 of the deflector arm although not positively connected to the spindle 24, is caused to move with the member 21 through the control member 36. When the deflector arm is in the position shown in Fig. 1, it lies across the main conveyer in a curved path simulating a continuation of the arcuate contour of the branch conveyer to effect deflection of carriers moving on the belt 11 toward and onto the branch conveyer 15. The momentum of the carriers 18, imparted thereto by the belt 11, effects continuation of the movement of the carriers onto the branch conveyer, where they will travel over the roller arm 51 and move the arm from the normal vertical position shown in solid lines in Fig. 6 to the dotted line position shown therein. By viewing Fig. 9, it will be apparent that this movement of the arm 51 effects opening of the switch 50, thus opening the locking circuit to the relay 57. If only one carrier is passing along the main conveyer at the time the deflector arm is in the position shown in Fig. 1, the opening of the release switch 50 will result in deenergization of the solenoid 45, rendering the spring 48 effective to move the arm into its normal position, following the deflected carrier. If a series of spaced carriers is travelling on the main conveyer at suitably spaced positions, the first carrier will open the release switch 50 in passing over the roller arm 51, effecting deenergization of the relay to render the spring 48 effective to start movement of the deflector arm into its normal position. The deflector arm, however, will meet an oncoming carrier following the first carrier and the force of the travelling carrier engaging the arm member 22 will cause movement of this member relative to the main arm member 21 into the relative positions shown in Fig. 5, in which positions the switch 40 is closed, completing another circuit through the relay 57, this circuit being traced from line 52, at 58, through switch 55, relay 57, connection 70, switch 40, to line 53 at 71. Through the closing of the switch 40, the relay 57 is again energized to close the contacts 61 and 62, effecting energization of the solenoid 45 to move the deflector arm back into its deflecting position shown in Fig. 1.

Therefore, the controlling mechanism for the deflector arm includes a portion, namely the switch 40, under the direct control of the arm, which is also under the control of carriers positioned to engage the arm. Furthermore, the contour of the deflector arm, that is the members 21 and 22 thereof, makes it possible for the carriers to cause relative movement of the arm members even if the carrier engages only the end of the arm after the arm has almost passed by the main conveyer. This is made possible through the variation in the overall lengths of the arm members, such being apparent by viewing the drawings, the free end of the arm member 22 extending beyond the adjacent end of the main arm member 21. Thus engagement of a carrier with the deflector arm will be with the member 22 thereof, effecting movement of the member 22 toward the member 21 to close the switch 40 to again cause energization of the solenoid 45 through the energization of the relay 57.

The embodiment of the invention herein disclosed is merely illustrative and may be widely modified and departed from in many ways without departing from the spirit and scope of the invention as pointed out in and limited solely by the appended claims.

What is claimed is:

1. In a conveyer system having connected conveyers to convey carriers in different directions, a deflector arm mounted adjacent the juncture of two conveyers, an electrical circuit, means electrically operated by the closing of the circuit to move the arm from a normal position into a deflecting position to deflect a carrier from one conveyer to another, means adapted to be actuated by the deflected carrier to effect opening of the circuit, means to return the arm to the normal position, and an electrical switch adapted to be actuated by the force of another carrier against the arm to again effect closing of the circuit.

2. In a conveyer system having connected conveyers to convey carriers in different directions, a deflector arm composed of companion members mounted at the juncture of two conveyers for movement with and relative to each other, means to move the arm from a normal position into a deflecting position to deflect a carrier from one conveyer to the other, means adapted to be actuated by the deflected carrier to render the moving means ineffective, means to return the arm to the normal position, and means actuated by relative movement of the companion members of the arm caused by engagement of another carrier therewith to render the moving means effective.

3. In a conveyer system having connected conveyers to convey carriers in different directions, a deflector arm composed of companion members mounted at the juncture of two conveyers for movement with and relative to each other, means to normally urge the members of the arm away from each other, means to move the arm from a normal position into a deflecting position to deflect a carrier from one conveyer to the other, means adapted to be actuated by the deflected carrier to render the moving means ineffective, means to return the arm to the normal position, and means actuated by relative movement of the companion members of the arm caused by engagement of another carrier therewith to render the moving means effective.

4. In a conveyer system having connected conveyers to convey carriers in different directions, a deflector arm composed of companion members mounted at the juncture of two conveyers for movement with and relative to each other, means to normally urge the members of the arm away from each other, means to limit the movement of the arm members relative to each other, means to move the arm from a normal position into a deflecting position to deflect a carrier from one conveyer to the other, means adapted to be actuated by the deflected carrier to render the moving means ineffective, means to return the arm to the normal position, and means actuated by relative movement of the companion members of the arm caused by engagement of another carrier therewith to render the moving means effective.

5. In a conveyer system having connected conveyers to convey carriers in different directions, a deflector arm composed of companion members mounted at the juncture of two conveyers for movement with and relative to each other, an electrical circuit, means electrically operated by the closing of the circuit to move the arm from a normal position into a deflecting position to deflect a carrier from one conveyer to another, means adapted to be actuated by the deflected carrier to effect opening of the circuit, means to return the arm to the normal position, and means adapted to be actuated by relative movement of the arm members caused by another carrier to again cause closing of the circuit.

6. In a conveyer system having connected conveyers to convey carriers in different directions, a deflector arm composed of companion members mounted at the juncture of two conveyers for movement with and relative to each other, an electrical circuit, means electrically operated by the closing of the circuit to move the arm from a normal position into a deflecting position to deflect a carrier from one conveyer to another, means adapted to be actuated by the deflected carrier to effect opening of the circuit, means to return the arm to the normal position, and an electrical switch adapted to be actuated by relative movement of the arm members caused by another carrier to again cause closing of the circuit.

7. In a conveyer system having connected conveyers to convey carriers in different directions, a shaft mounted adjacent the juncture of the two conveyers, a deflector arm composed of companion members, one fixedly mounted on the shaft and the other rotatably mounted on the shaft, means to normally urge the members of the arm away from each other, means to rotate the shaft to move the arm from a normal position into a deflecting position to deflect a carrier from one conveyer to another, means adapted to be actuated by the deflected carrier to render the rotating means ineffective, means operatively connected to the shaft to return the arm to its normal position, and means actuated by relative movement of the companion members of the arm caused by engagement of another carrier therewith to render the rotating means effective.

DONALD H. MITCHELL.